(12) United States Patent
Thangarasa et al.

(10) Patent No.: US 11,889,438 B2
(45) Date of Patent: Jan. 30, 2024

(54) PROSE OPERATION ON NON-SERVING CARRIER FREQUENCY

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 124 days.

(21) Appl. No.: 15/768,336

(22) PCT Filed: Oct. 13, 2016

(86) PCT No.: PCT/SE2016/050990
§ 371 (c)(1),
(2) Date: Apr. 13, 2018

(87) PCT Pub. No.: WO2017/065680
PCT Pub. Date: Apr. 20, 2017

(65) Prior Publication Data
US 2018/0343627 A1    Nov. 29, 2018

Related U.S. Application Data

(60) Provisional application No. 62/241,960, filed on Oct. 15, 2015.

(51) Int. Cl.
*H04W 56/00* (2009.01)
*H04W 24/10* (2009.01)
(Continued)

(52) U.S. Cl.
CPC ........... *H04W 56/001* (2013.01); *H04W 4/80* (2018.02); *H04W 24/10* (2013.01);
(Continued)

(58) Field of Classification Search
CPC ............... H04W 56/001; H04W 56/00; H04W 56/0015; H04W 4/80; H04W 4/023;
(Continued)

(56) References Cited

U.S. PATENT DOCUMENTS 9,072,111 B2 *  6/2015  Ogawa ................ H04L 27/2605
9,338,719 B2 *  5/2016  Iwamura ............... H04W 24/10
(Continued)

FOREIGN PATENT DOCUMENTS

EP         2385723 A1    11/2011
WO    2014168539 A1    10/2014
(Continued)

OTHER PUBLICATIONS

3Gpp, "3rd Generation Partnership Project; Technical Specification Group Radio Access Network; Evolved Universal Terrestrial Radio Access (E-UTRA); Requirements for support of radio resource management (Release 13)", 3GPP Ts 36.133 V13.1.0, Sep. 2015, 1-1430.

(Continued)

*Primary Examiner* — Un C Cho
*Assistant Examiner* — Rasha K Fayed
(74) *Attorney, Agent, or Firm* — Sage Patent Group

(57) ABSTRACT

A method (300) performed in a network node is disclosed for enabling ProSe operation for a wireless device on a non-serving carrier. The network node serves the wireless device on a cell on a serving carrier. The method (300) comprises: determining (310) whether a target cell on a non-serving serving carrier, on which the wireless device is to perform ProSe operation, is known or unknown to the wireless device, and configuring (320, 330) the wireless device with a first gap configuration for the case that the target cell on the non-serving carrier is known to the wireless device, and with a second gap configuration for the case that the target cell on (Continued)

the non-serving carrier is unknown to the wireless device. A method in a wireless device, a network node, a wireless device, computer programs and computer program products are also disclosed.

13 Claims, 4 Drawing Sheets

(51) Int. Cl.
*H04W 72/51* (2023.01)
*H04W 72/542* (2023.01)
*H04W 4/80* (2018.01)
*H04W 72/0446* (2023.01)
*H04W 72/12* (2023.01)
*H04W 76/14* (2018.01)
*H04W 8/00* (2009.01)

(52) U.S. Cl.
CPC ... *H04W 72/0446* (2013.01); *H04W 72/1215* (2013.01); *H04W 72/51* (2023.01); *H04W 72/542* (2023.01); *H04W 8/005* (2013.01); *H04W 76/14* (2018.02)

(58) Field of Classification Search
CPC ........... H04W 72/0446; H04W 72/085; H04W 72/048; H04W 72/1215; H04W 72/04; H04W 72/08; H04W 72/12; H04W 72/082; H04W 72/042; H04W 72/1273; H04W 72/0406; H04W 72/10; H04W 72/0413; H04W 76/14; H04W 76/23; H04W 76/19; H04W 76/048; H04W 76/28; H04W 8/005; H04W 8/22; H04W 24/10; H04W 24/00; H04W 24/02; H04W 52/0216; H04W 52/0206; H04W 52/0229; H04W 52/367; H04W 52/0209; H04W 52/30; H04W 52/383; H04W 84/045; H04W 84/00; H04W 48/16; H04W 48/20; H04W 88/06; H04W 88/02; H04L 5/0092; H04L 5/0048; H04L 5/0053; H04L 5/001; H04B 17/27; H04B 17/318; H04B 17/382
See application file for complete search history.

(56) References Cited

U.S. PATENT DOCUMENTS

| | | | | |
|---|---|---|---|---|
| 9,526,064 | B2* | 12/2016 | Kim | H04W 56/00 |
| 9,801,148 | B2* | 10/2017 | Yu | H04W 56/001 |
| 2007/0155344 | A1* | 7/2007 | Wiessner | H04B 1/48 |
| | | | | 455/78 |
| 2010/0273487 | A1* | 10/2010 | Alonso-Rubio | H04W 36/385 |
| | | | | 455/436 |
| 2011/0014906 | A1* | 1/2011 | Ho | H04B 17/309 |
| | | | | 455/422.1 |
| 2012/0129517 | A1* | 5/2012 | Fox | H04L 25/03987 |
| | | | | 455/425 |
| 2012/0147772 | A1* | 6/2012 | Kazmi | H04W 24/08 |
| | | | | 370/252 |
| 2013/0003584 | A1* | 1/2013 | Alriksson | H03G 3/3052 |
| | | | | 370/252 |
| 2013/0295958 | A1* | 11/2013 | Siomina | G01S 5/0205 |
| | | | | 455/456.1 |
| 2013/0301466 | A1* | 11/2013 | Nenner | H04W 36/0022 |
| | | | | 370/252 |
| 2014/0036707 | A1* | 2/2014 | Kitazoe | H04W 36/0088 |
| | | | | 370/252 |
| 2014/0056395 | A1* | 2/2014 | Alriksson | H03G 3/3078 |
| | | | | 375/345 |
| 2014/0087750 | A1* | 3/2014 | Taori | H04W 24/02 |
| | | | | 455/452.2 |
| 2014/0119175 | A1* | 5/2014 | Velde | H04W 76/19 |
| | | | | 370/225 |
| 2014/0133428 | A1* | 5/2014 | Kazmi | H04W 28/04 |
| | | | | 370/329 |
| 2014/0314047 | A1* | 10/2014 | Kalhan | H04W 36/0072 |
| | | | | 370/331 |
| 2015/0038143 | A1* | 2/2015 | Kilpatrick, II | H04W 64/00 |
| | | | | 455/436 |
| 2015/0071101 | A1* | 3/2015 | Mager | H04W 24/10 |
| | | | | 370/252 |
| 2015/0092578 | A1* | 4/2015 | Ingale | H04W 52/0209 |
| | | | | 370/252 |
| 2015/0249972 | A1* | 9/2015 | You | H04L 5/0035 |
| | | | | 370/254 |
| 2015/0365835 | A1* | 12/2015 | Segev | H04W 8/005 |
| | | | | 370/252 |
| 2016/0007400 | A1* | 1/2016 | Agiwal | H04W 72/02 |
| | | | | 370/329 |
| 2016/0073366 | A1* | 3/2016 | Ng | H04W 24/10 |
| | | | | 370/329 |
| 2016/0174056 | A1* | 6/2016 | Nagata | H04W 8/005 |
| | | | | 370/329 |
| 2016/0192439 | A1* | 6/2016 | Phuyal | H04L 5/0048 |
| | | | | 370/315 |
| 2016/0205573 | A1* | 7/2016 | Yang | H04W 24/10 |
| | | | | 370/241 |
| 2016/0295430 | A1* | 10/2016 | Jung | H04L 5/00 |
| 2017/0150501 | A1* | 5/2017 | Park | H04W 72/0446 |
| 2017/0288804 | A1* | 10/2017 | Gaudino | H04J 14/0227 |
| 2017/0295554 | A1* | 10/2017 | Lee | H04W 56/0025 |
| 2017/0339679 | A1* | 11/2017 | Lee | H04L 5/0048 |
| 2018/0076984 | A1* | 3/2018 | Yang | H04L 25/03 |
| 2018/0097676 | A1* | 4/2018 | Kazmi | H04L 27/2647 |
| 2018/0220303 | A1* | 8/2018 | Futaki | H04W 16/32 |
| 2018/0279368 | A1* | 9/2018 | Butt | H04W 72/0453 |
| 2018/0302779 | A1* | 10/2018 | Fujishiro | H04W 92/18 |
| 2019/0045345 | A1* | 2/2019 | Lee | H04W 4/06 |

FOREIGN PATENT DOCUMENTS

| | | |
|---|---|---|
| WO | 2015122819 A1 | 8/2015 |
| WO | 2015142704 A1 | 9/2015 |

OTHER PUBLICATIONS

Unknown, Author, "Discussion on LS on Gap handling for Sidelink Discovery", 3GPP TSG-RAN WG4 Meeting #76bis, R4-155557, Sophia Antipolis, France, Oct. 12-16, 2015, 1-10.
Unknown, Author, "Reply LS on gap handling for sidelink discovery", 3GPP TSG.RAN WG4 Meeting #76bis, R4-156631, Sophia Antipolis, France, Oct. 12-16, 2015, 1-2.
Unknown, Author, "RRM impacts of inter-frequency Prose discovery", 3GPP TSG-RAN WG4 Meeting #76bis, R4-155852, Sophia Antipolis, France, Oct. 12-16, 2015, 1-4.
Unknown, Author, "Synchronization overhead for D2D Discovery operation on non-serving carrier", 3GPP TSG RAN WG4 Meeting #78, R4-160980, Feb. 15-19, 2016, 1-7.
Office Action issued in corresponding EP Application No. 16785579.0; dated Jan. 22, 2019; 04 pages. All references cited therein have been previously made of record.
Office Action issued in corresponding EP Application No. 16785579.0; dated Dec. 17, 2019; 05 pages. All references cited therein have been previously made of record.

* cited by examiner

PROSE OPERATION ON NON-SERVING CARRIER FREQUENCY

TECHNICAL FIELD

The disclosure relates to ProSe operation. More specifically this disclosure relates to methods and operations performed by network nodes and wireless devices for ProSe operation on non-serving carrier frequencies, as well as to a network node and a wireless device of a radio communications system.

BACKGROUND

UE Measurements

Radio measurements done by a UE are typically performed on a serving cell as well as on neighbor cells over some known reference symbols or pilot sequences. These cell measurements may be done on an intra-frequency carrier, inter-frequency carrier(s) as well as on inter-RAT carriers(s) (the latter depending on the UE capability, i.e. whether it supports additional RATs). For the UE to be able to perform the inter-frequency and inter-RAT measurements, measurement gaps are required, and the network therefore has to configure these measurement gaps.

The measurements are done for various purposes. Some example measurement purposes are: mobility (e.g. cell selection, handover etc.), positioning, self-organizing network (SON), minimization of drive tests (MDT), operation and maintenance (O&M), network planning and optimization etc. Examples of measurements in LTE are Cell identification (also known as PCI acquisition), Reference Symbol Received Power (RSRP), Reference Symbol Received Quality (RSRQ), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used, for instance, for scheduling and link adaptation by the network. Examples of CSI measurements or CSI reports are CQI, PMI, RI etc. They may be performed on reference signals such as CRS, CSI-RS or DMRS.

The DL subframe #0 and subframe #5 carry synchronization signals (i.e. both PSS and SSS). In order to identify an unknown cell (e.g. new neighbor cell) the UE has to acquire the timing of that cell and eventually the physical cell ID (PCI). This is called as cell search or cell identification. Subsequently the UE also measures RSRP and/or RSRQ of the newly identified cell in order to use itself and/or report the measurement to the network node. In total there are 504 PCIs. The cell search is also a type of measurement. The UE searches or identifies a cell (i.e. acquire PCI of the cell) by correlating the received PSS/SSS signals in DL subframe #0 and/or in DL subframe #5 with one or more of the pre-defined PSS/SSS sequences. The use of subframe #0 and/or in DL subframe #5 for PCI acquisition depends upon its implementation. The UE regularly attempts to identify neighbor cells on at least the serving carrier frequency/frequencies. However, it may also search cells on non-serving carrier(s) when configured by the network node. In order to save UE power consumption, the UE typically searches in one of the DL subframes #0 and #5. In order to further save its battery power the UE searches the cell once every 40 ms in non-DRX or in short DRX cycle (e.g. up to 40 ms). In longer DRX cycle the UE typically searches a cell once every DRX cycle. During each search attempt the UE typically stores a snapshot of 5-6 ms and post process by correlating the stored signals with the known PSS/SSS sequences. In non-DRX the UE is able to identify an intra-frequency cell (including RSRS/RSRQ measurements) within 800 ms (i.e. 20 attempts in total including 15 and 5 samples for cell identification (PCI acquisition) and RSRP/RSRQ measurement).

The measurements are done in all RRC states i.e. in RRC idle and RRC connected states.

Radio Network Node Measurements

In order to support different functions such as mobility (e.g. cell selection, handover etc), positioning a UE, link adaption, scheduling, load balancing, admission control, interference management, interference mitigation etc., the radio network node also performs radio measurements on signals transmitted and/or received by the radio network node. Examples of such measurements are SNR, SINR, received interference power (RIP), BLER, propagation delay between UE and itself, transmit carrier power, transmit power of specific signals (e.g. Tx power of reference signals), positioning measurements like TA, eNode B Rx-Tx time difference etc.

D2D Operation

D2D UEs always transmit D2D signals or channels in the uplink part of the spectrum. D2D operation by a UE is in a half-duplex mode, i.e. the UE can either transmit D2D signals/channels or receive D2D signals/channels. There may also be D2D relay UEs that may relay some signals to other D2D UEs. There is also control information for D2D, some of which is transmitted by D2D UEs and the other is transmitted by eNodeBs (e.g., D2D resource grants for D2D communication transmitted via cellular DL control channels). The D2D transmissions may occur on resources which are configured by the network or selected autonomously by the D2D UE.

D2D communication implies transmitting by a D2D transmitter D2D data and D2D communication control information with scheduling assignments (SAs) to assist D2D receivers of the D2D data. The D2D data transmissions are according to configured patterns and in principle may be transmitted rather frequently. SAs are transmitted periodically. D2D transmitters that are within the network coverage may request eNodeB resources for their D2D communication transmissions and receive in response D2D resource grants for SA and D2D data. Furthermore, eNodeB may broadcast D2D resource pools for D2D communication.

D2D discovery messages are transmitted in infrequent periodic subframes. eNodeBs may broadcast D2D resource pools for D2D discovery, both for reception and transmission.

The D2D communication supports two different modes of D2D operation: mode 1 and mode 2.

In mode 1, the location of the resources for transmission of the scheduling assignment by the broadcasting UE comes from the eNodeB. The location of the resource(s) for transmission of the D2D data by the broadcasting UE comes from the eNodeB.

In mode 2 a resource pool for scheduling assignment is pre-configured and/or semi-statically allocated. The UE on its own selects the resource for scheduling assignment from the resource pool for scheduling assignment to transmit its scheduling assignment.

An interruption of operation (i.e. transmission and/or reception) on a primary cell (PCell), i.e. a serving cell, may occur for different reasons. PCell interruption of one subframe occurs, for instance, when the UE switches its reception between D2D operation and wide area network (WAN)

operation (D2D-to-WAN or WAN-to-D2D). This is because the receiver chain of the UE needs to be retuned every time the operation is switched from WAN to D2D reception and from D2D to WAN reception. This applies to both D2D discovery and D2D communication capable UEs. It is important to partition uplink resources between cellular uplink and D2D operation in such a way that it avoids or minimize the risk of switching taking place in certain subframes, i.e. subframe #0 and/or #5, of PCell. These subframes contain essential information such as PSS/SSS that are necessary for doing cell search, carrying out cell measurements and they also contain MIB/SIB1 information which is necessary for SI reading procedures. In addition to interruption that takes places due to switching, there may be additional interruption of one subframe due to the RRC reconfiguration procedure. While the switching interruption takes place for single rx UE (e.g. D2D discovery capable UEs), the RRC reconfiguration interruption takes place for all types of D2D UEs (e.g. D2D Discovery capable and D2D Communication capable).

D2D operation is a generic term which may comprise of transmission and/or reception of any type of D2D signals (e.g. physical signals, physical channel etc) by a D2D communication capable UE and/or by D2D discover capable UE. D2D operation is therefore also called as D2D transmission, D2D reception, D2D communication etc.

D2D UE is also interchangeably called as ProSe capable UE. Similarly D2D operation may also be called as ProSe operation. D2D discovery capable UE is also referred to as UE capable of Prose direct discovery and D2D direct communication UE is also referred to as UE capable ProSe direct communication. The link/carrier that is used for the ProSe direct communication and ProSe direct discovery between UEs is referred to as sidelink. The sidelink therefore contains radio resources (e.g. subframes, resource blocks), which are assigned for ProSe operation.

Carrier Aggregation

A UE may be able to operate (receive and transmit data) on more than a single carrier and such multi-carrier operation is known as carrier aggregation (CA). Each aggregated carrier may be referred to as a component carrier (CC).

Potential Problem with Existing Approaches

Up to now, procedures, requirements and support for D2D operation exist only for operation on a Primary Cell (PCell), or serving cell. There are no procedures and requirements defined for how D2D operation can be operated in a non-serving carrier of the UE. The non-serving carrier can and may have different timing than the carrier of the serving cell e.g. PCell, SCell, PSCell etc. For example the transmit timing of the non-serving carrier can be by shifted by one or more symbols, time slots or subframes with respect to the transmit timing of the serving cells of the UE. Also the serving cell and the cell on the non-serving carrier may not be located at the same location. This also results in different time of arrival of signals at the UE from the serving cell and the cell on the non-serving carrier. Since D2D is typically operated on the uplink resources, UE needs to acquire the timing of the carrier and synchronize its receiver/transmitter in both time and frequency in order to transmit/receive D2D signals on that carrier.

In order to perform ProSe operation on a non-serving carrier, the UE needs to synchronize to that carrier. The synchronization procedure may include acquisition of PSS/SSS and/or PSSS/SSSS to acquire the PCI or ID of the cell on that carrier.

Thereafter, the UE needs to synchronize in both time and frequency to align its time and frequency tracking function before it can start transmitting or receiving on that carrier. The UE whose serving carrier is different than the carrier on which it intends to perform ProSe cannot perform synchronization procedure following these steps because the ProSe carrier is a different carrier than its serving carrier. The UE cannot measure and synchronize to that non-serving carrier, which may e.g. be an inter-frequency carrier. This is a problem with the existing solution for ProSe operation.

SUMMARY

It is therefore an object to address some of the problems outlined above, and to provide solutions for allowing ProSe operation on a non-serving carrier.

According to aspects, the object is achieved by a method performed by a network node such as an eNodeB, and a method performed by a wireless device such as a UE. Furthermore, a network node and a wireless device adapted to perform the methods are provided. According to further aspects, the object is achieved by computer programs and computer program products.

The object is according to an aspect achieved by a method performed in a network node for enabling ProSe operation for a wireless device on a non-serving carrier, the network node serving the wireless device on a cell on a serving carrier. The method comprises determining whether a target cell on a non-serving carrier, on which the wireless device is to perform ProSe operation, is known or unknown to the wireless device, and configuring the wireless device with a first gap configuration for the case that the target cell on the non-serving carrier is known to the wireless device, and with a second gap configuration for the case that the target cell on the non-serving carrier is unknown to the wireless device.

The object is according to an aspect achieved by a computer program for a network node for enabling ProSe operation for a wireless device on a non-serving carrier. The computer program comprises computer program code, which, when executed on at least one processor circuit on the network node causes the network node to perform the method as above.

The object is according to an aspect achieved by a computer program product comprising a computer program as above and a computer readable means on which the computer program is stored.

The object is according to an aspect achieved by a network node for enabling ProSe operation for a wireless device on a non-serving carrier, the network node being configured to serve the wireless device on a cell on a serving carrier. The network node is configured to: determine whether a target cell on a non-serving carrier, on which the wireless device is to perform ProSe operation, is known or unknown to the wireless device, and to configure the wireless device with a first gap configuration for the case that the target cell on the non-serving carrier is known to the wireless device, and with a second gap configuration for the case that the target cell on the non-serving carrier is unknown to the wireless device.

The object is according to an aspect achieved by a method performed in a wireless device for performing ProSe operation on a non-serving carrier, the wireless device being served by a network node on a cell on a serving carrier. The method comprises obtaining a first gap configuration for the case that a target cell on the non-serving carrier is known to the wireless device, and a second gap configuration for the case that the target cell on the non-serving carrier is unknown to the wireless device, and applying one of the first gap configuration and the second gap configuration for performing ProSe operation on the target cell on the non-serving carrier.

The object is according to an aspect achieved by a computer program for a wireless device for performing ProSe operation on a non-serving carrier, the computer program comprising computer program code, which, when executed on at least one processor circuit on the wireless device causes the wireless device to perform the method as above.

The object is according to an aspect achieved by a computer program product comprising a computer program as above and a computer readable means on which the computer program is stored.

The object is according to an aspect achieved by a wireless device for performing ProSe operation on a non-serving carrier, the wireless device being served by a network node on a cell on a serving carrier. The wireless device is configured to obtain a first gap configuration for the case that a target cell on the non-serving carrier is known to the wireless device, and a second gap configuration for the case that the target cell on the non-serving carrier is unknown to the wireless device, and to apply one of the first gap configuration and the second gap configuration for performing ProSe operation on the target cell on the non-serving carrier.

According to an aspect, a method performed by a network node serving a ProSe capable wireless device or UE is provided. According to an embodiment the method comprises determining whether the target cell on a non-serving carrier is known or unknown to the UE. The method further comprises, when the target cell is known, configuring the ProSe capable UE with a first configuration of a gap. The first configuration is a configuration of a gap of a duration of at least delta-T2. The method further comprises, when the target cell is not known, configuring the ProSe capable UE with a second configuration of a gap. The second configuration is a configuration of a gap of a duration of at least delta-T4. The duration delta-T4 is greater than the duration delta-T2. The method also comprises adapting the scheduling based on the configuration of the gap.

According to an aspect, a method performed by a ProSe capable wireless device or UE served by a network node is provided. According to an embodiment, the method comprises, when the target cell is known, receiving or obtaining a first configuration of a gap. The first configuration may be received from the network node or pre-configured. The first configuration is a configuration of a gap of a duration of at least delta-T2. The method may further comprise when the target cell is not known, receiving or obtaining a second configuration of a gap. The second configuration is a configuration of a gap with a duration of at least delta-T4. The duration delta-T4 is greater than the duration delta-T2. The method may also comprise determining whether a target cell on a non-serving carrier is known or unknown to the UE. There are different optional methods to find out whether the target cell is known or unknown, as will be described below. The method also comprises performing measurements on the target cell on the non-serving carrier based on or adapted to the configuration of gap. The measurements may be performed in the gap according to the gap configuration.

In an exemplary embodiment of the method performed by the network node serving the ProSe capable wireless device or UE, the method may comprise determining whether a cell (cell2, e.g. target cell), on a non-serving carrier (F2) of the UE, is known to the UE or not. The cell (cell2) may be known if the UE has sent a measurement report (e.g. RSRP) for the cell (cell2) to the network node in a certain period of time. The period of time may e.g. be the latest or last T1 seconds (e.g. 5 seconds), or a period which is derived based on the DRX period used (e.g. 5 times the length of the DRX cycle). The method may further comprise configuring the wireless device or UE with one or more gaps. The gap should be configured with a duration of at least delta-TX, the gap occurring before the ProSe operation duration. One example of the ProSe operation duration is the ProSe discovery transmission duration (referred to as delta-T3 herein). The configuring of a gap before the ProSe operation duration, is made to enable the UE to perform ProSe on a cell (cell2) on a non-serving carrier (F2) during the gaps. Delta-TX is configured to be equal to delta-T2 (e.g. 20 ms) if the cell2 is known to the UE, and to be equal to delta-T4 (e.g. 80 ms), larger than delta-T2, if the cell2 is unknown to the UE. The method may also comprise adapting scheduling of signals to the UE during delta-TX. In one embodiment, the adapting comprises not scheduling the UE on any of the serving cells of the UE during delta-TX.

In an exemplary embodiment of the method performed by the ProSe capable wireless device or UE served by the network node, the method may comprise obtaining (either receiving from the network node or retrieving a preconfigured) a configuration of one or more gaps. The gap should be configured with a duration of at least delta-TX, the gap occurring before the ProSe operation duration. One example of the ProSe operation duration is the ProSe discovery transmission duration (referred to as delta-T3 herein). Delta-T3 may thus also be the duration of the gap for ProSe operation. The configuring of a gap before the ProSe operation duration is made to enable the UE to perform ProSe on a cell (cell2) on a non-serving carrier (F2) during the gaps. Delta-TX is configured to be equal to delta-T2 (e.g. 20 ms) if the cell2 is known to the UE, and to be equal to delta-T4 (e.g. 80 ms), larger than delta-T2, if the cell2 is unknown to the UE. The method may also comprise determining whether cell2 is known to the UE or not, wherein cell2 is known if the UE has done at least one measurement on signals of cell2, or has sent a measurement report (e.g. RSRP) for cell2 to the network node in the last T1 seconds (e.g. 5 seconds, 5× length of DRX cycle etc). The method may comprise adapting one or more procedures to tune to cell2 during delta-TX, wherein delta-TX=delta-T2 or delta-T4 based on whether cell2 is known or unknown to the UE.

The method may also comprise starting a gap immediately after delta-TX, where the purpose of this started gap is to perform ProSe operation during the gap.

Advantages of Embodiments are that:

They enable ProSe operation on non-serving carriers.

They reduce the interruption time on WAN when intending to do D2D on non-serving carrier.

They enable the resources to be used more efficiently when a D2D UE intends to operate on non-serving carrier.

The scheduling grants are not lost at the network node when the D2D UE served by the network node tunes to the cell belonging to non-serving carrier.

They enable the UE to perform ProSe operation on a cell of the non-serving carrier even if the UE is not synchronized to that cell before it receives gaps for doing ProSe. This in turn avoids the need for the UE to measure on cells of non-serving carriers well before starting the ProSe operation on such a carrier.

Other objects, advantages and features of embodiments will be explained in the following detailed description when considered in conjunction with the accompanying drawings and claims.

DETAILED DESCRIPTION

Figure 1:
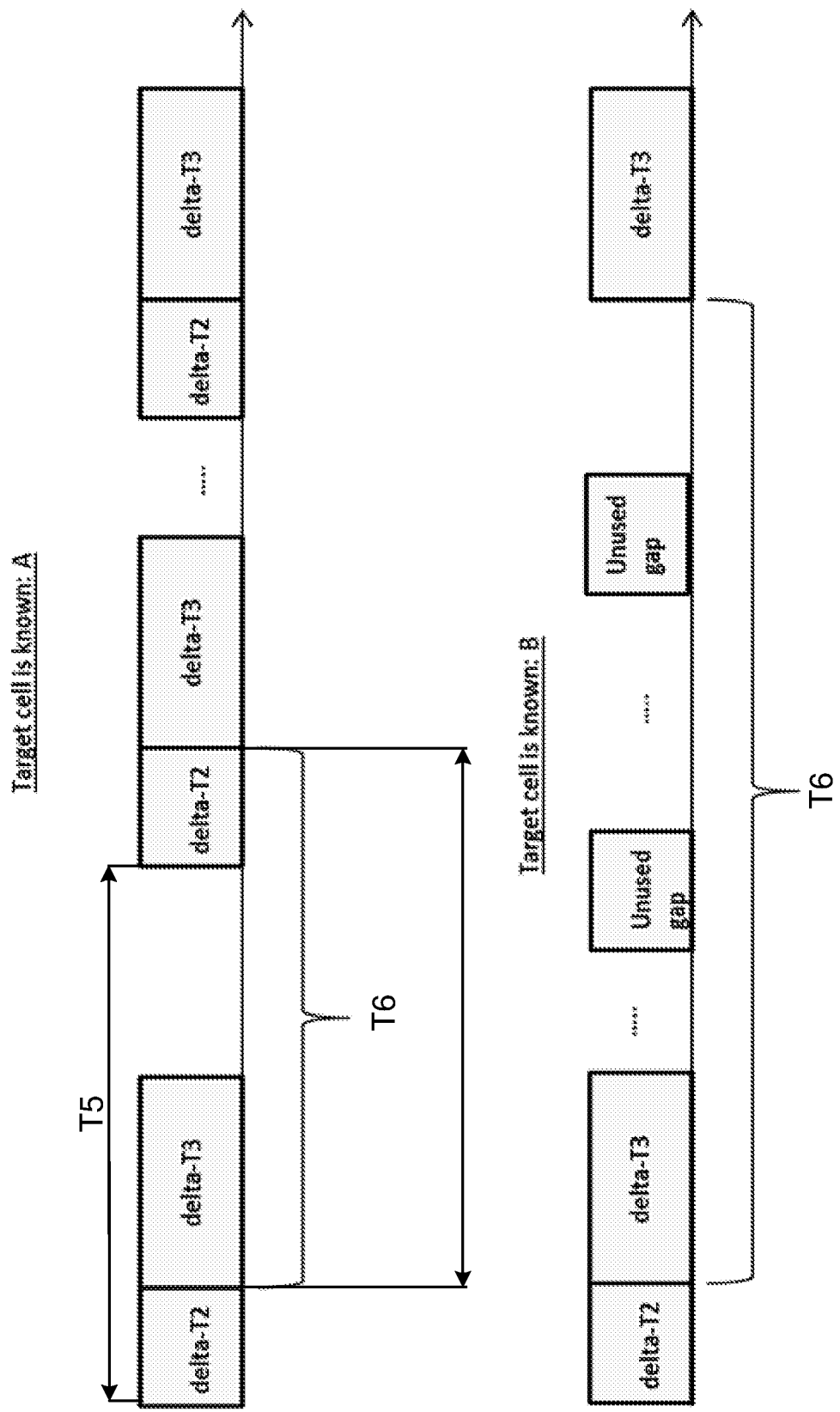
FIG. 1 is a schematic illustration of configured gaps for ProSe when target cell is known to UE according to embodiments.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of a method and a node, they may also be embodied in a computer program product as well as in a system comprising a computer processor and a memory coupled to the processor, wherein the memory is encoded with one or more programs that may perform the functions disclosed herein.

In some embodiments a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, nodes in distributed antenna system (DAS), core network node, O&M, OSS, SON, positioning node (e.g. E-SMLC), MDT etc.

In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for LTE. However, the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

The description of embodiments of the invention is divided into the following sections:
1. General description of scenario
2. Method in a network node for determining and communicating gap configuration for ProSe on non-serving carrier
3. Method in a ProSe UE for determining state and adapting the procedure for operating ProSe on non-serving carrier
4. Example implementations of UE and network node
5. Overall description of gap handling for sidelink discovery

1. General Description of Scenario

The scenario comprises at least one network node serving a first cell, e.g. a PCell, aka serving cell. The D2D capable UE (also denoted ProSe capable UE) can be pre-configured by the PCell with ProSe resources for ProSe operation of the D2D UE on a sidelink. The pre-configured ProSe resources may in particular be used by the D2D UE when operating in Out of Network Coverage (ONC). The sidelink may typically operate on a carrier of the PCell (aka serving carrier frequency or intra-frequency carrier). The sidelink may also be configured for ProSe operation on a non-serving carrier of the D2D UE. The non-serving carrier can be inter-frequency carrier, inter-RAT carrier or any carrier which is not configured as the serving carrier. For example, the non-serving carrier can be one configured as inter-frequency carrier frequency for doing WAN measurements or a carrier frequency only configured for doing ProSe operation.

A network node of a WAN may provide the serving cell (PCell) and the target cell (SCell) on the non-serving carrier or only the serving cell PCell. It is noted that the first network node may belong to a first network operator and the second network node may belong to a second network operator. As a particular example, a first network node provides cellular service on the PCell and a second network node provides ProSe (D2D) service on the SCell. The first network node configures the ProSe UE on the PCell as well as on the SCell.

In some embodiments the D2D UE may also be configured with another cell that is configurable upon need basis, for instance a secondary cell SCell1. In some embodiments the SCell1 may be served by a second network node. The embodiments apply regardless of whether the PCell and one or more SCells are served by the same or different network nodes. In this case D2D UE can be pre-configured with ProSe resources for ProSe operation on sidelink which may operate on carrier of PCell or of SCell or of any non-serving carrier. The D2D UE can be pre-configured with ProSe resources for ProSe operation on a plurality of sidelinks e.g. carriers of PCell, SCell1 and non-serving carrier.

The network node may also configure the D2D UE with a third cell, SCell2 on a different carrier (different than SCell1) on a need basis. The embodiments presented in this disclosure apply for UE configured with such carrier aggregation with any number of SCells. That is, the UE may be configured with one or more SCells.

In some embodiments the UE may be configured with PCell and PSCell or with PCell, PSCell and one or more SCells such as in dual connectivity. The configured cells are UE specific and the embodiments included in this disclosure may be applied on UE basis for each configured cell.

The D2D UE may also be configured with one or more carriers for doing measurements on the cells for the configured carriers. The UE may be configured with such carriers for measuring in idle state and/or in connected state.

The UE is configured with at least one serving cell (e.g. PCell) on a serving carrier F1.

There are mainly two cases related to the start of ProSe operation on a non-serving cell on a non-serving carrier:

1. UE intends to start ProSe operation (e.g. discovery) on at least one non-serving cell (cell2) on a non-serving carrier (F2);

2. Network node (NW node) can request the UE to start ProSe operation (e.g. discovery) on the cell2 on F2.

In case 1) the UE sends a request to the NW node and in response the NW node assigns gaps to the UE for ProSe on the cell2 on F2.

In case 2) NW node sends request to UE to start proSe on F2 using gaps, and also provides gap configuration etc.

The gaps may be period or aperiodic. During the gaps the UE is not required to receive and transmit signals in the serving cell. The gaps (i.e. cessation of serving cell operation) allow the UE to reuse its resources (e.g. receiver, local oscillator, radio frequency (RF) components like power amplifier) for doing ProSe operation. Therefore, in the gaps the UE can receive and/or transmit ProSe signals on the non-serving cell.

Examples of gaps are periodic measurement gaps used by the UE for doing UE measurements. The gaps are typically network node controlled i.e. configured by the NW node at the UE. More specifically such periodic measurement gaps comprise of a gap with gap length of 6 ms occurring every 40 ms or 80 ms. The gap length may also be shorter or longer than 6 ms e.g. it can be equal to the duration over which ProSe operation is to be performed by the UE.

Figure 2:
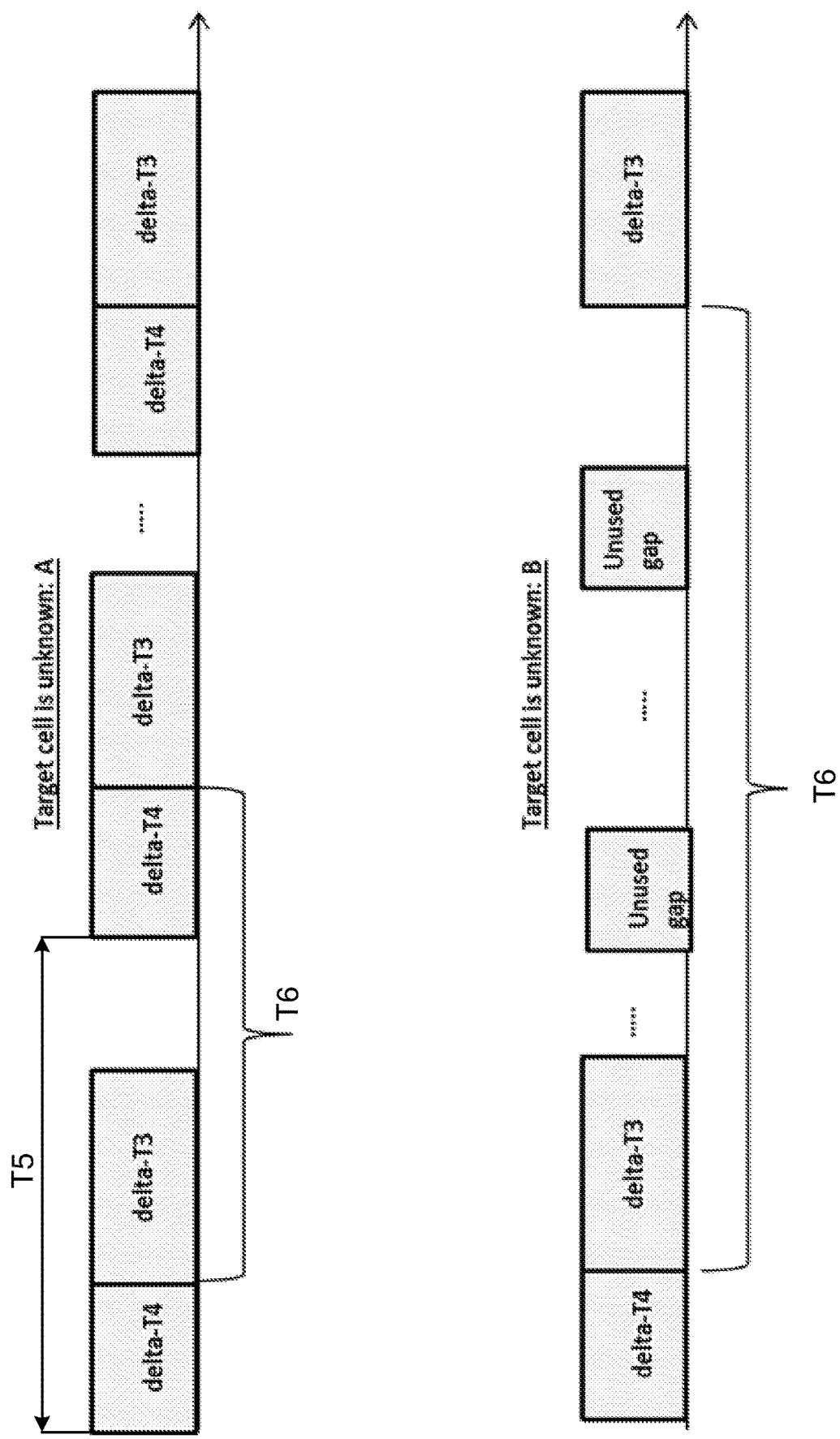
FIG. 2 is a schematic illustration of configured gaps for ProSe when target cell is unknown to UE according to embodiments.

The overall procedure is summarized in FIG. 1 for the case when the target cell is known and in FIG. 2 when the target cell is unknown. For each case, the gaps may be of two types, namely type A and B. As described earlier, the configuration of a gap (delta-T2) before the ProSe operation (delta-T3) enables the UE to perform the ProSe operation on a non-serving carrier during these gaps. As indicated earlier, the ProSe operation may, for instance, comprise ProSe discovery transmission.

In FIG. 1, type A gaps are illustrated in the upper part of the figure. The delta-T2 gap is configured such that it occurs just before the ProSe subframes, i.e. just before the gaps (delta-T3) configured for actual ProSe operation. This means that it is configured to occur in the time slot before the gap for ProSe operation, delta-T3. The main advantage of this way of configuring the gap is that the UE can perform synchronization in a background such that it is able to operate ProSe on the actual ProSe gaps (e.g. ProSe subframes), i.e. during delta-T3. For instance, when the target cell is on an inter-frequency carrier, which is also used for ProSe operation, the measurement on such carrier is done in the conventional measurement gaps. The UE is already synchronized to this carrier i.e. target cell on this carrier. However, the disadvantage of this way of configuring gap is that it occurs on periodic basis and frequently, and it may not always be necessary. For example, the UE may remember the synchronization parameters from earlier and those may still be valid if it has not been long time since it was synchronized. In such cases, it is unnecessary to assign gaps (delta-T2) every time before the actual ProSe operation. During each such gap (delta-T2) prior to the actual ProSe transmission (or other ProSe operation), the UE cannot be scheduled on the WAN carrier and thus resources may not be well utilized (in the WAN).

In FIG. 1, a gap period T5 is illustrated, which is the periodicity with which the ProSe gaps delta-T2 occur. Further, a ProSe discovery period T6 is illustrated. The ProSe discovery period T6 is the periodicity with which ProSe discovery signals are transmitted by the ProSe UE.

In FIG. 1, type B gaps are also illustrated. This type B gap configuration does not have the above mentioned disadvantage. The delta-T2 gap is configured such that it takes place just before the actual ProSe subframes, i.e. delta-T3, as for type A. In this case, the UE may synchronize its transmitter and receiver to the time- and frequency to be used during delta-T3 before the start of delta-T3 such that it can operate the ProSe subframes (having the duration delta-T3). The advantage of this way of configuring the gaps is that since gaps of delta-T2 may be periodic, they will occur periodically depending on its configuration. If the UE does not perform ProSe operation, then there will be delta-T2 durations that are not needed for synchronization to such ProSe operation, i.e. there are unused delta-T2 gaps. The UE may use the unused delta-T2 gaps that may occur after actual ProSe subframes (delta-T3) to (re-)synchronize the receiver/transmitter to the frequency such that it becomes ready for ProSe operation when delta-T3 starts. In this case, the UE does not have to perform synchronization on periodic basis every time just before the start of each delta-T3, as in type A, but only upon need. This will reduce the scheduling impact on the WAN as the UE cannot be scheduled in the WAN during the duration delta-T2. Instead, it may perform synchronization only if necessary, and in unused gaps. Typically, if the time since the last synchronization is short, then UE may not need to synchronize again to the time- and frequency.

FIG. 2 illustrates the similar cases when the target cell is not known. This is very similar to the description of FIG. 1 type A and FIG. 1 type B, but the difference is that the duration of the gap is delta-T4 instead, different from delta-T2. In the case of unknown target cell, the UE may need longer duration to synchronize in time and frequency to be able to operate ProSe on that carrier, and a longer duration of the gap may be needed. Thus it is expected that length of delta-T4 is longer than delta-T2.

2. Method in a Network Node for Determining and Communicating Gap Configuration for ProSe Operation on Non-serving Carrier This description contains embodiments that can be implemented in a network node.

Overview of the Network Node Procedure

Figure 3:
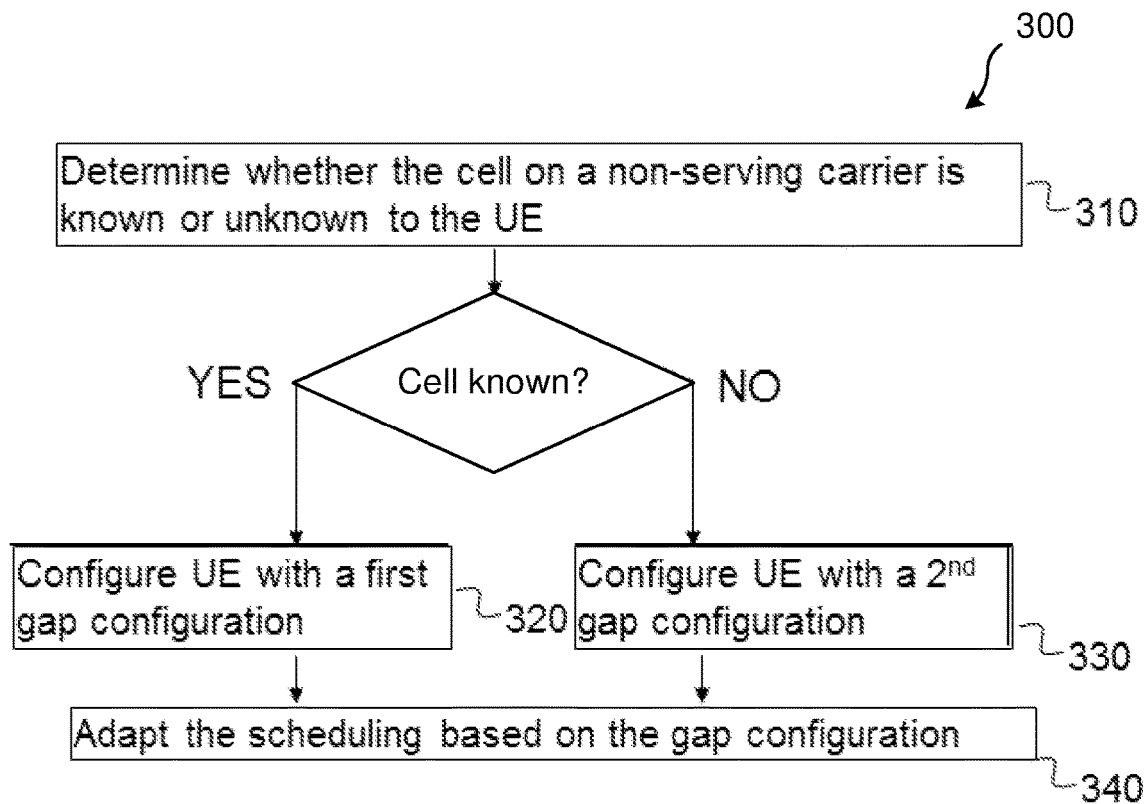
FIG. 3 is a flowchart illustrating the method in a network node according to embodiments.

The overall procedure in the network node can be as follows, as illustrated in the flowchart of FIG. 3:

310: Network node determines whether the cell (cell2) on non-serving carrier (i.e. the target cell) is known to the UE or not.

Depending on determination in previous step network node configures the UE with gaps as follows:

If it is determined that the target cell on non-serving carrier on which UE intends to do ProSe is known (YES) then the network node may configure 320 the ProSe capable UE with a first gap configuration. If it is determined that the target cell on non-serving carrier on which UE intends to do ProSe is not known (NO) then the network node may configure 330 the ProSe capable UE with a second gap configuration.

In following section, we describe the cases more in detail.

Detailed Description of the Network Procedure

In this embodiment the network node (e.g. eNodeB) makes a determination on the target cell and based on that derives a configuration. The network node then configures the ProSe UE with configuration related to gaps and it may also communicate the derived configuration to other nodes in the network. The determination of information is done based on several criteria which are explained more below.

As a first step network node determines whether the target cell (e.g. cell2) on the non-serving carrier is already known to the UE or not. The UE intends to do or is expected to or is required to do ProSe operation on cell2. The network node may assume that the target cell is known if the ProSe UE is synchronized to the target cell, cell2. The synchronization for example means that the UE knows the timing of cell2 and is able to receive radio signals from cell2. The UE is assumed to be synchronized to cell2 if for example the following criterion is met:

UE has sent a valid measurement report (e.g. RSRP) for that cell to the network node in the last T1 seconds (e.g. T1 can be 5 seconds, or 5×length of DRX cycle etc.).

The ProSe UE can be configured to report one or more measurements (e.g. RSRP) to the network node on periodic-, event-triggered- or event-triggered and periodic basis.

The measurement report is considered to be a valid measurement report if one or more requirements are met e.g. measurement period=800 ms, measurement accuracy is within ±2 dB.

In a first example, it is assumed that the network node receives a gap-request from the ProSe UE. The request is a request for a gap configuration, to enable the ProSe UE to perform ProSe operation on a sidelink on a non-serving cell, cell2, on a non-serving carrier frequency, F2. The action by the serving NW node (e.g. eNodeB) in this case would be that it will check whether the UE1 has sent any measurement report on cell2. In this first example, it is assumed that the UE has not reported any measurement on cell2 within a defined time period, T1. Therefore the serving NW node (e.g. eNodeB) may assume that cell2 is unknown to UE i.e. UE is not synchronized to cell2.

In a second example, it is assumed that the network node receives a gap-request from the ProSe UE to perform ProSe operation on a sidelink on a non-serving cell, cell2, on a non-serving carrier frequency, F2. The action by the serving NW node (e.g. eNodeB) in this case would be that it will check whether the UE has sent any measurement report on cell2. In this second example, it is assumed that the UE has reported one or several measurement reports related to cell2. The serving NW node (e.g. eNodeB) will then check the validity of the latest measurement report. In this case, the network node determines that the latest measurement report is older than T1. Therefore the serving NW node (e.g. eNodeB) may assume that cell2 is unknown to the UE.

In a third example, it is assumed that the network node receives a gap-request from the ProSe UE to perform ProSe operation on a sidelink on a non-serving cell, cell2, on a non-serving carrier frequency, F2. The action by the serving NW node (e.g. eNodeB) in this case would be that it will check whether the UE has sent any measurement report on cell2. In this third example, it is assumed that the UE has reported one or several measurement reports related to cell2. The serving NW node (e.g. eNodeB) will then check the validity of the latest measurement report. In this case, network node determines that the latest measurement report was reported within the defined time period T1. Therefore the serving NW node (e.g. eNodeB) may assume that cell2 is known to the UE.

The network node may also use other methods to find out whether the target cell is known. For example, it may use historical information, target cell location in relation to the ProSe UE (the target cell may, for instance, be considered known if the ProSe UE is within a defined distance from the target cell) etc. to find out whether the target cell is known. Typically, UE may also monitor numerous cells and perform measurements on them provided that the cells are detectable. The cells monitored by the UE may be intra-frequency cells, inter-frequency cells or inter-RAT cells. The network node may also use this information to find out whether the target cell on the non-serving carrier is already known at the UE.

Based on the determination on whether the target cell is known or not, the network may take following actions:

(YES)—NW actions when cell2 is known:

If it was determined by the network node that the target cell, cell2, is known, then the network node may configure the UE with gaps at least delta-T2 before the start of ProSe operation duration. This configuration may interchangeably be referred to herein as the first gap configuration. The ProSe operation duration in this case may include ProSe Discovery transmission durations, i.e. the subframes that are expected to be used for ProSe. The ProSe operation duration is denoted delta-T3 in this case and the network node may configure the UE with gaps to do ProSe. As an example, delta-T2 may be defined as 20 ms under the condition that the target cell is known. If this is the case, then UE may already perform measurements on that cell before the triggering for ProSe operation on that carrier.

During delta-T2 the network node may adapt its scheduling, e.g. adapt so that the network node does not schedule that UE on any of the serving cells during duration of delta-T2. The duration delta-T2 can be pre-defined or configured by the network node. Without the herein suggested delta-T2 duration, the UE may cause interruption on serving cells as UE has to tune to UL on the frequency of non-serving carrier for ProSe operation. During this delta-T2 duration, the UE may synchronize its receiver and transmitter with time- and frequency on that non-serving carrier to be able to transmit and/or receive on that carrier.

The advantage of this is that unpredictable interruptions are avoided and the network node may adapt its scheduling such that it avoids scheduling that UE in the subframes of delta-T2 since the network node knows that the UE will perform the retuning there. This means that resources are better utilized and it will improve the WAN performance, but also ProSe operation.

If the target cell on the non-serving carrier is known, it may take shorter time for the UE to perform synchronization to that cell. For example, the PCI of that cell may already be known and the UE may remember the synchronization parameters related to time- and frequency as it has already performed measurement on that cell. Thus the gap configured in this case will be different than the one derived for the case when target cell is unknown.

(NO)—NW actions when cell2 is unknown:

If it was determined by the network node that the target cell, cell2, is not known at the UE, then the network node may configure the UE with gaps of length at least delta-T4 before the actual ProSe operation duration. This configuration may interchangeably be denoted herein as the second gap configuration. The duration delta-T4 can be pre-defined or configured by the network node. The duration of ProSe operation is denoted delta-T3 and, the duration delta-T4 may, as an example, be 80 ms under the condition that the target cell is unknown.

During delta-T4 the network node will adapt 340 its scheduling e.g. the network node does not schedule the ProSe UE on any of the serving cell(s). This is because the UE may cause interruption on serving cells as UE has to tune to UL of the non-serving carrier for ProSe operation. During this time, UE may synchronize its receiver and transmitter with time- and frequency on that non-serving carrier to be able to transmit and/or receive on that carrier.

If the target cell on the non-serving carrier is unknown, it may take longer time to perform synchronize to it. Thus the gap configured in this case will be different than the one derived for the case when target cell is known. The first gap configuration (used for the case that the target cell is known) comprises delta-T2 gaps and the second gap configuration (used for the case that the target cell is unknown) comprises delta-T4 gaps. Since the UE typically needs more time to synchronize to an unknown cell, delta-T4 typically has a longer duration than delta-T2.

In both of the above network node cases, i.e. both when the target cell is known and when it is unknown, the configured gaps are typically periodic with period (T5) shorter than ProSe transmission period (T6) aka ProSe Discovery period. Examples of T5 and T6 are 80 ms and 320 ms, respectively. During gaps when no Prose communication is done (i.e. no transmission or reception), the UE can do measurements (e.g. DL timng, RSRP for PC etc) on DL part of cell2 on non-serving carrier, F2, in the unused delta-T2 gaps.

Method of Signaling Information about Gap Configuration to ProSe UE (and Other Nodes)

This embodiment is related to transmitting derived configuration related to gaps to other nodes. Examples of other nodes which receive the configuration are ProSE UE, ProSe Relay UE, eNode B, base station, access point core network nodes, positioning node or any other node used for dedicated services such as self-organizing network (SON) node.

There are significant advantages in sharing the gap configuration with other nodes. One advantage is that the same or partial information may be applicable to other nodes in the network, and in that case it can be reused. This way, the gaps can be coordinated among the nodes in the network and the improvements (e.g. avoiding colliding gap configurations, measurement performance on non-serving carriers) can be improved in large scale.

A second advantage is that deriving the gap configurations, which can be quite complex sometimes, can be done in one place and only once, and then signaled to other nodes in the network. This way, processing in the different nodes in the network can be reduced.

The various features and embodiments described can be combined in different ways, examples of which are given in the following with reference still to FIG. 3.

A method 300 is provided that may be performed in a network node 500 for enabling ProSe operation for a wireless device 550 on a non-serving carrier. The network node 500 may, for instance, be any of the exemplary nodes described earlier (e.g. a NodeB, MeNB, SeNB, a network node belonging to MCG or SCG etc.). The network node 500 serves the wireless device 550 on a cell on a serving carrier.

The method 300 comprises determining 310 whether a target cell on a non-serving carrier, on which the wireless device 550 is to perform ProSe operation, is known or unknown to the wireless device 550. The target cell is a cell on which the wireless device 550 is to perform ProSe operation.

The method 300 comprises configuring 320, 330 the wireless device 550 with a first gap configuration for the case that the target cell on the non-serving carrier is known to the wireless device 550, and with a second gap configuration for the case that the target cell on the non-serving carrier is unknown to the wireless device 550. Adapting the length of the gap based on whether or not the target cell is known to the wireless device 550 provides many advantages. For instance, the network node 500 may configure the wireless device 550 with a longer gap if the wireless device 550 does not know the target cell, hence giving more time to synchronize to the target cell before performing ProSe transmission or reception in the target cell.

The first gap configuration is used for the case that the target cell is known and comprises gaps of duration delta-T2 gaps. The second gap configuration is used for the case that the target cell is unknown and comprises gaps of the duration delta-T4. Since the UE typically needs more time to synchronize to an unknown cell, delta-T4 typically has a longer duration than delta-T2.

The method 300 provides a number of advantages, as have been described. For instance, by means of the gap configuration the method enables the wireless device 550 (e.g. an UE) to perform ProSe operation on a cell of the non-serving carrier. This in turn avoids the need for the wireless device 550 to measure on cells of non-serving carriers well before starting the ProSe operation on such a carrier.

In an embodiment, the method 300 comprises adapting 340 scheduling for the wireless device 550 based on the configuration of the gap.

In a variation of the above embodiment, the adapting 340 comprises adapting the scheduling such that the wireless device 550 has no operation on the cell of the serving carrier during the duration of the configured first or second gap configuration. This embodiment has several advantages. For instance, by taking the ProSe operation of the wireless device 550 into account when scheduling the wireless device 550 may, as has been described earlier, synchronize its receiver and transmitter with time- and frequency on the non-serving carrier during the gap.

In various embodiments, the adapting 340 comprises, for the case that the target cell on the non-serving carrier is known to the wireless device 550, not scheduling the wireless device 550 on the serving cell during a duration delta-T2 of the first gap configuration. The network node 500 may hence avoid scheduling the wireless device 550 on the serving cell during the gaps, i.e. taking into account the gap configuration in the scheduling.

In various embodiments, the adapting 340 comprises, for the case that the target cell on the non-serving carrier is unknown to the wireless device 550, not scheduling the wireless device 550 on the serving cell during a duration delta-T4 of a gap of the second gap configuration.

In various embodiments, the duration delta-T4 of a gap of the second gap configuration is greater than duration delta-T2 of a gap of the first gap configuration. Such embodiments have been described e.g. in relation to FIG. 2.

In various embodiments, the determining 310 whether the target cell is known or unknown is based on one or more of: the wireless device 550 being synchronized to the target cell on the non-serving carrier, the wireless device 550 having sent a measurement report for the target cell on the non-serving carrier within a defined time period, historical information, cells monitored by the wireless device 550 and location of a target cell in relation to the wireless device 550. There are thus many options for the network node 500 to determine whether the target cell on a non-serving carrier is known or unknown to the wireless device 550. It is noted that the various examples may be combined in many ways. The network node 500 may, for instance, base the determination on both historical information and cells monitored by the wireless device. It is noted that when basing the determination on cells being monitored by the wireless device 550 the time T1 elapsed since the last time the cell was monitored should preferably also be taken into account. If the wireless device 550 monitors the cell but the time elapsed is too long, then the cell may still be unknown to the wireless device from a synchronization point of view.

In various embodiments, the method 300 comprises signaling the configured gap configuration to one or more network nodes. An advantage is, as has been described, that same, or at least partially same, information can be signaled to and reused by another node. Another advantage, also indicated earlier, is that a single node (the serving node) performs the deriving of the gap configurations and then signals them to other nodes, thereby reducing processing burden of these other nodes.

In various embodiments, the method 300 is triggered by one of: the wireless device requesting the network node for grant to operate ProSe on a non-serving carrier, and the network node 500 requesting the wireless device 550 to start ProSe operation on the target cell on the non-serving carrier.

Figure 4:
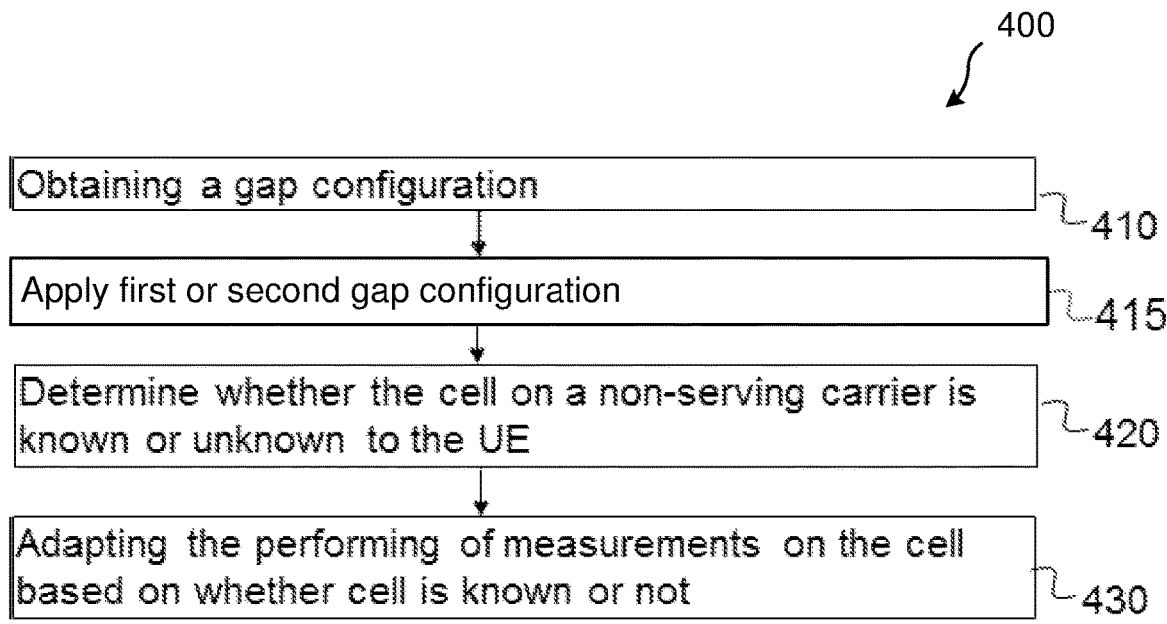
FIG. 4 is a flowchart illustrating the method in a wireless device according to embodiments.

3. Method in a ProSe UE for Determining State and Adapting the Procedure for Operating ProSe on Non-serving Carrier This embodiment, as illustrated in FIG. 4, discloses a method in a ProSe UE to obtain/acquire 410 information or gap configurations. The receiving ProSe UE then uses the obtained information/configuration to perform measurements 430 on the target cell on the non-serving carrier.

As one step, the ProSe UE may determine 420 whether the target cell, e.g. cell2, on the non-serving carrier on which the UE intends to do ProSe is already known at the UE or not. The UE may assume that the target cell is known if the ProSe UE is synchronized to cell2 e.g. it knows the cell2 timing. The UE may determine that it is synchronized to cell2 if it has performed measurement on cell2 in the last T1 second and/or sent a valid measurement report (e.g. RSRP) for that cell (i.e. cell2) to the network node in the last T1 seconds (e.g. 5 seconds, 5× DRX cycle etc.).

In a first example, it is assumed that the ProSe UE intends to perform ProSe operation on sidelink on a non-serving cell, cell2, on a non-serving carrier frequency, F2. The action by the ProSe UE in this case would be that it will check whether it has performed any measurement and/or sent any measurement report on cell2. In this first example, it is assumed that the UE has not reported any measurement on cell2 to the network node or has not measured cell2 in the last time period T1. Therefore UE may assume that cell2 is unknown i.e. it is not synchronized to cell2 or has lost synchronized to cell2.

In a second example, it is assumed that ProSe UE is interested in performing ProSe operation on sidelink on a non-serving cell, cell2, on a non-serving carrier frequency, F2. The action by the UE in this case would be that it will check whether it has performed any measurement and/or sent any measurement report on cell2. In this second example, it is assumed that the UE has reported several measurement reports related to cell2. UE1 will then check the validity of the latest measurement. In this case, UE determines that the latest measurement performed or report to the network node is older than T1. Therefore UE1 may assume that cell2 is unknown.

In a third example, it is assumed that ProSe UE is interested in performing ProSe operation on sidelink on a non-serving cell, cell2, on a non-serving carrier frequency, F2, by ProSe UE. The action by UE in this case would be that it will check whether it has performed measurement and/or sent any measurement report on cell2. In this third example, it is assumed that the UE has reported several measurement reports related to cell2. The UE will then check the validity of the latest measurement. In this case, UE determines that the latest measurement report was reported within duration T1. Therefore UE may assume that cell1 is known.

The UE may also use other methods to find out whether the target cell is known. For example, it may use historical information, target cell location in relation to the ProSe UE etc. to find out whether the target cell is known. Typically, UE may also monitor numerous cells and perform measurements on them provided that the cells are detectable. The cells monitored by the UE may be intra-frequency cells, inter-frequency cells or inter-RAT cells. UE may also use this information to find out whether the target cell on the non-serving carrier is already known at the UE.

Based on the determination on whether the target cell is known or not, the UE may adapt 430 its measurement procedure. Below we describe the two possible cases and how the measurement procedure using is adapted.

UE actions when cell2 is known:

If it was determined by the UE node that the target cell is known, then the ProSe UE may expect to receive a gap configuration from its serving network node (e.g. eNodeB). The received gap configuration may comprise a gap of at least delta-T2 before the start of ProSe operation. As stated earlier the duration delta-T2 can be pre-defined, or configured at the UE by the network node. The delta-T2 may also be determined by the UE and signaled to the network node. The network node in turn may use this received parameter to decide when to configure the gap i.e. at least during delta-T2 before the start of ProSe operation. The duration of ProSe operation in this case, denoted as delta-T3, may comprise the subframes which are to be used for ProSe transmission/reception from the target cell. The duration delta-T3 for example may appear once or may occur multiple times with some periodicity. Example of value of delta-T2 is 20 ms under the condition that the target cell, e.g. cell2, is known. If this is the case, then UE may already perform measurements on that cell before the triggering for ProSe operation on that carrier.

The ProSe UE will then use the received gap configuration, i.e. the duration of delta-T2, to (re)-tune its receiver/transmitter to be able to perform ProSe operation on the uplink carrier of the non-serving carrier, e.g. on the sidelink on F2. Thereafter the UE can perform ProSe operation during the duration of delta-T3.

During the duration of delta-T2, the UE may be allowed to cause interruption on the serving cells. Since the network node is aware of delta-T2, unpredictable interruptions can be avoided since the serving network node can adapt its scheduling accordingly.

If the target cell on the non-serving carrier is known, it may take shorter time to perform synchronization to that cell. For example, the PCI of that cell may already be known and it may remember the synchronization parameters related to time- and frequency as it has already performed measurement on that cell. Thus the gap configured in this case will be different than the one derived for the case when target cell is unknown.

UE actions when cell2 is unknown:

If it was determined by the ProSe UE that the target cell is not known to the UE, then the UE may expect to receive second configuration related to gaps. The received gaps may comprise at least the duration of delta-T4 before the actual ProSe operation duration. As stated earlier the duration delta-T4 can be pre-defined or configured at the UE by the network node. The delta-T4 may also be determined by the UE and signaled to the network node. The network node in turn may use this received parameter to decide when to configure the gap i.e. at least delta-T4 before the start of ProSe operation. The duration used for actual ProSe operation is denoted delta-T3. As an example, the duration of delta-T4 may be 80 ms under the condition that the target cell, cell2, is not known at the UE. The UE will be required to first synchronize to cell2 before it can start ProSe operation on cell2. To achieve synchronization to cell2, the UE may detect cell2 e.g. by performing correlation of synchronization signals received from cell2 with known synchronization sequences. The UE may achieve the synchronization for cell2 within delta-T4 (e.g. 80 ms) provided that the required signal quality of cell2 at the UE is sufficient to successfully perform cell detection of cell2 on the first attempt.

The ProSe UE will use the received gap configuration, i.e. the duration of delta-T4, to (re)-tune its receiver/transmitter to perform ProSe operation on the uplink carrier of the non-serving carrier, e.g. on the sidelink on F2. Thereafter the UE can perform ProSe operation during the duration of delta-T3.

During the duration of delta-T4, the UE may be allowed to cause interruption on the serving cells. Since the network node is aware of delta-T4, unpredictable interruptions can be avoided since the serving network node can adapt its scheduling accordingly.

If the target cell on the non-serving carrier is unknown, it may take longer time to synchronize to it. Thus the gap configured in this case will be different than the one derived for the case when target cell is known.

In both of the above UE cases, i.e. both when the target cell is known and when it is unknown the UE may be configured with gaps. The UE may check the gap period (T5) and compare it with the ProSe transmission period (T6) aka discovery period. Examples of T5 and T6 are 80 ms and 320 ms. If T5 is shorter than T6, then during gaps when no ProSe is done (illustrated as unused gaps in FIGS. 1 and 2) the UE may do measurements (e.g. of DL timing, or RSRP for PCell) on DL part of cell2 on F2. The UE uses this information for doing ProSe during delta-T3 without any additional interruption on any serving cell.

The various features and embodiments described can be combined in different ways, examples of which are given in the following with reference still to FIG. 4. It is noted that the flow chart illustrates several embodiments, and that not all the steps shown in the flow chart need to be included in all embodiments. For instance, in one embodiment the method 400 comprises only steps 410 and 415.

A method 400 performed in a wireless device 550 is provided for performing ProSe operation on a non-serving carrier. The wireless device 550 may, for instance, be any of the exemplary devices described earlier (e.g. a device to device UE machine type UE, PDA etc. able to perform ProSe operation). The wireless device 550 is being served by a network node 500 on a cell on a serving carrier. The wireless device 550 is a ProSe enabled device, i.e.

The method 400 comprises obtaining 410 a first gap configuration for the case that a target cell on the non-serving carrier is known to the wireless device 550, and a second gap configuration for the case that the target cell on the non-serving carrier is unknown to the wireless device 550.

The method 400 comprises applying 415 one of the first gap configuration and the second gap configuration for performing ProSe operation on the target cell on the non-serving carrier.

In an embodiment, the method 400 comprises, prior to applying 415 the first gap configuration or the second gap configuration, determining 420 whether the target cell on the non-serving carrier is known or unknown to the wireless device 550.

In a variation of the above embodiment, the determining 420 is based on one or amore of: the wireless device 550 being synchronized to the target cell on the non-serving carrier, the wireless device 550 having sent a measurement report for the target cell on the non-serving carrier within a defined time period, historical information, cells monitored by the wireless device 550 and location of a target cell in relation to the wireless device 550. As noted in relation to the description of the corresponding method 300 performed in the network node 500, these various examples may be combined in many ways, and for e.g. examples on possible combinations reference is made to this part of the description.

In various embodiments, the method 400 comprises adapting 430, based on the obtained first or second gap configuration, a measurement procedure for measurements on the target cell.

In a variation of the above embodiment, the adapting 430 comprises performing measurements on the target cell on the non-serving carrier according to one of the obtained first and second gap configuration.

In various embodiments, the obtaining 410 comprises determining 420 whether the target cell on the non-serving carrier, on which the wireless device 550 is to perform ProSe operation, is known or unknown to the wireless device 550, and:

determining duration, delta-T2, of a gap of a first gap configuration for the case that the target cell on the non-serving carrier is known to the wireless device 550, determining a duration, delta-T4, of a gap of a second gap configuration for the case that the target cell on the non-serving carrier is unknown to the wireless device 550, and signaling the determined duration to the network node 550.

In various embodiments, the obtaining 410 comprises receiving, from the network node 550, a gap configuration, and the method 400 comprises using the received gap configuration for synchronizing a receiver and transmitter of the wireless device 550 with time and frequency of the non-serving carrier.

In various embodiments, the target cell on the non-serving carrier is known to the wireless device 550 when the wireless device 550 has performed a measurement or sent a measurement report for the target cell on the non-serving carrier within a defined time period, otherwise the target cell is unknown to the wireless device 550.

4. Example Implementations of Wireless Device and Network Node

Figure 5:
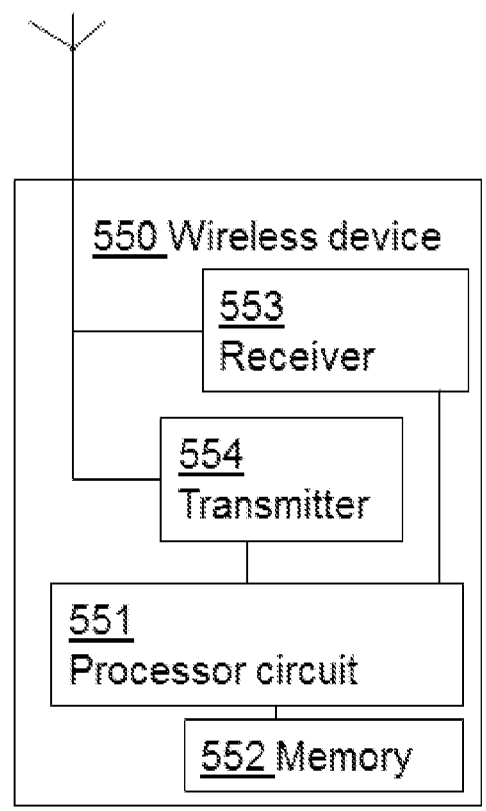
FIG. 5 is a block diagram schematically illustrating a network node and a wireless device according to embodiments.
Figure 5:
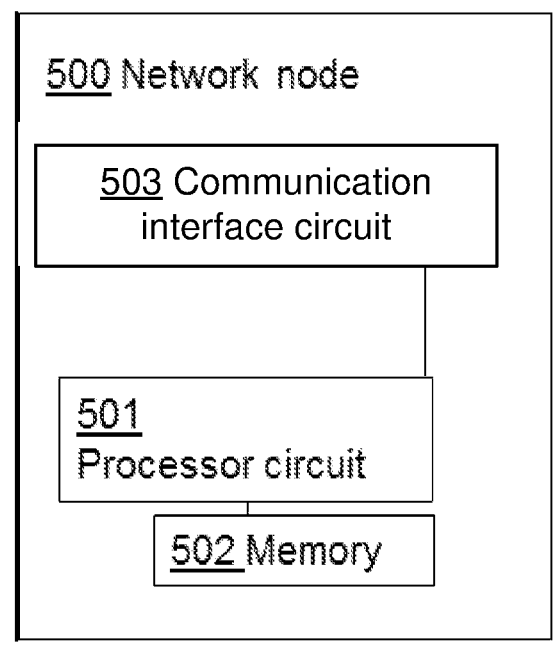

FIG. 5 illustrates a block diagram of the network node 500 and the wireless device 550, in accordance with a particular embodiment. Here the wireless device 550 communicates with the network node 500.

The network node comprises a communication interface circuit 503 for communicating with the wireless device. If the network node is an eNodeB, the communication interface circuit may comprise a transceiver which may be connected via an antenna port to a same or to different transmitting/receiving antennas. The network node also comprises control circuitry, which may comprise a processor circuit 501 connected to a memory 502. The control circuitry is connected to the communication interface circuit, which may e.g. provide receiver and transmitter and/or transceiver functionality. The network node 500 may be adapted to carry out any of the methods performed by the network node disclosed herein. The memory 502 may comprise instructions executable by said processor circuit 501 whereby said network node 500 is operative to perform the methods described herein.

The wireless device 550 in FIG. 5 comprises a receiver circuit 553 and a transmitter circuit 554 for communicating with the network. The receiver and transmitter circuits may be connected via one or more antenna ports to a same or to different transmitting/receiving antennas. The wireless device 550 also comprises control circuitry, which may comprise a processor circuit 551 connected to a memory 552. The control circuitry is connected to the transmitter and receiver circuitry, which provide receiver and transmitter functionality. The wireless device 550 may be adapted to carry out any of the methods performed by the wireless device disclosed herein. The memory 552 may comprise instructions executable by said processor circuit 551 whereby said wireless device 550 is operative to perform the methods described herein.

In an alternative way to describe the embodiment in FIG. 5, the network node 500 comprises a Central Processing Unit (CPU) which may be a single unit or a plurality of units. Furthermore, the network node 500 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the network node 500 causes the CPU to perform steps of the procedure described earlier e.g. in conjunction with FIG. 3. In other words, when said code means are run on the CPU, they correspond to the processing circuit 501 of FIG. 5.

Furthermore, the wireless device 550 may comprise a Central Processing Unit (CPU) which may be a single unit or a plurality of units, and at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the wireless device 550 causes the CPU to perform steps of the procedure described earlier e.g. in conjunction with FIG. 4. In other words, when said code means are run on the CPU, they correspond to the processing circuit 551 of FIG. 5.

A network node 500 is provided for enabling ProSe operation for a wireless device 550 on a non-serving carrier, the network node 500 being configured to serve the wireless device 550 on a cell on a serving carrier. The network node 500 is configured to:

determine whether a target cell on a non-serving carrier, on which the wireless device 550 is to perform ProSe operation, is known or unknown to the wireless device 550, configure the wireless device 550:

with a first gap configuration for the case that the target cell on the non-serving carrier is known to the wireless device 550, and with a second gap configuration for the case that the target cell on the non-serving carrier is unknown to the wireless device 550.

As described earlier, the network node 500 may be configured to perform the above steps e.g. by comprising one or more processors or processor circuit 501 and memory 502, the memory 502 containing instructions executable by the processor circuit 501, whereby the network node 500 is operative to perform the steps. In an embodiment thus, a network node is provided for enabling ProSe operation for a wireless device on a non-serving carrier, the network node being configured to serve the wireless device on a cell on a serving carrier. The network node comprises one or more processors and/or processing circuit and memory, the memory containing instructions executable by the processor and/or processing circuit, whereby the network node is operative to: determine whether a target cell on a non-serving carrier, on which the wireless device is to perform ProSe operation, is known or unknown to the wireless device; and to configure the wireless device with a first gap configuration for the case that the target cell on the non-serving carrier is known to the wireless device, and with a second gap configuration for the case that the target cell on the non-serving carrier is unknown to the wireless device.

In an embodiment, the network node 500 is configured to adapt by scheduling for the wireless device 550 based on the configuration of the gap.

In an embodiment, the network node 500 is configured to adapt by scheduling such that the wireless device 550 has no operation on the cell on the serving carrier during the duration of the configured first or second gap configuration.

In various embodiments, the network node 500 is configured to adapt by not scheduling the wireless device 550 on the serving cell during a duration, delta-T2, of a gap of the first gap configuration for the case that the target cell on the non-serving carrier is known to the wireless device 550.

In various embodiments, the network node 500 is configured to adapt by not scheduling the wireless device 550 on the serving cell during a duration, delta-T4, of a gap of the second gap configuration for the case that the target cell on the non-serving carrier is unknown to the wireless device (550).

In various embodiments, the duration, delta-T4, of a gap of the second gap configuration is greater than duration, delta-T2, of a gap of the first gap configuration.

In various embodiments, the network node 500 is configured to determine whether the target cell is known or unknown based on one or more of: the wireless device 550 being synchronized to the target cell on the non-serving carrier, the wireless device 550 having sent a measurement report for the target cell on the non-serving carrier within a defined time period, historical information, cells monitored by the wireless device 550 and location of a target cell in relation to the wireless device 550.

In various embodiments, the network node 500 is configured to signal the configured gap configuration to one or more network nodes.

In some embodiments, a network node is provided comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 400 that has been described in various embodiments.

A network node is thus provided for enabling ProSe operation for a wireless device on a non-serving carrier. The network node comprises a first module for determining whether a target cell on a non-serving carrier, on which the wireless device is to perform ProSe operation, is known or unknown to the wireless device, Such first module may, for instance, comprise processing circuitry adapted to determine whether the target cell is known or unknown to the wireless device.

The network node comprises a second module for configuring the wireless device with a first gap configuration for the case that the target cell on the non-serving carrier is known to the wireless device, and with a second gap configuration for the case that the target cell on the non-serving carrier is unknown to the wireless device. Such second module may, for instance, comprise processing circuitry adapted to configure the wireless device with the first or second gap configuration.

It is noted that one or more of the modules may be replaced by units.

A wireless device 550 is provided for performing ProSe operation on a non-serving carrier, the wireless device 550 being served by a network node 500 on a cell on a serving carrier. The wireless device 550 is configured to:

obtain a first gap configuration for the case that a target cell on the non-serving carrier is known to the wireless device 550, and a second gap configuration for the case that the target cell on the non-serving carrier is unknown to the wireless device 550, and apply one of the first gap configuration and the second gap configuration for performing ProSe operation on the target cell on the non-serving carrier.

As described earlier, the wireless device 550 may be configured to perform the above steps e.g. by comprising one or more processors or processor circuit 551 and memory 552, the memory 552 containing instructions executable by the processor circuit 551, whereby the wireless device 550 is operative to perform the steps. In an embodiment thus, a wireless device is provided for performing ProSe operation on a non-serving carrier, the wireless device being served by a network node on a cell on a serving carrier. The wireless device comprises one or more processors and/or processing circuit and memory, the memory containing instructions executable by the processor and/or processing circuit, whereby the wireless device is operative to: obtain a first gap configuration for the case that a target cell on the non-serving carrier is known to the wireless device, and a second gap configuration for the case that the target cell on the non-serving carrier is unknown to the wireless device, and apply one of the first gap configuration and the second gap configuration for performing ProSe operation on the target cell on the non-serving carrier.

In an embodiment, the wireless device 550 is configured to, prior to applying the first gap configuration or the second gap configuration, determine whether the target cell on the non-serving carrier is known or unknown to the wireless device 550.

In an embodiment, the wireless device 550 is configured to, determine whether the target cell is known or unknown based on one or more of based on one or more of: the wireless device 550 being synchronized to the target cell on the non-serving carrier, the wireless device 550 having sent a measurement report for the target cell on the non-serving carrier within a defined time period, historical information, cells monitored by the wireless device 550 and location of a target cell in relation to the wireless device 550.

In various embodiments, the wireless device 550 is configured to, adapt, based on the obtained first or second gap configuration, a measurement procedure for measurements on the target cell.

In various embodiments, the wireless device 550 is configured to perform measurements on the target cell on the non-serving carrier according to one of the obtained first and second gap configuration.

In various embodiments, the wireless device 550 is configured to obtain by determining whether the target cell on the non-serving carrier, on which the wireless device 550 is to perform ProSe operation, is known or unknown to the wireless device 550, and to:

determine duration, delta-T2, of a gap of a first gap configuration for the case that the target cell on the non-serving carrier is known to the wireless device 550, determine a duration, delta-T4, of a gap of a second gap configuration for the case that the target cell on the non-serving carrier is unknown to the wireless device 550, and to signal the determined duration to the network node 550.

In various embodiments, the wireless device 550 is configured to obtain by receiving, from the network node 550, a gap configuration, and to use the received gap configuration for synchronizing a receiver and transmitter of the wireless device 550 with time and frequency of the non-serving carrier.

In various embodiments, the wireless device 550 is configured to receive and/or transmit ProSe signaling on the non-serving cell during the received gap configuration.

In various embodiments, the target cell on the non-serving carrier is known to the wireless device 550 when the wireless device 550 has performed a measurement or sent a measurement report for the target cell on the non-serving carrier within a defined time period, otherwise the target cell is unknown to the wireless device 550.

In some embodiments, a network node is provided comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 400 that has been described in various embodiments.

A wireless device is thus provided for performing ProSe operation on a non-serving carrier, the wireless device being served by a network node on a cell on a serving carrier. The wireless device comprises a first module for obtaining a first gap configuration for the case that a target cell on the non-serving carrier is known to the wireless device, and a second gap configuration for the case that the target cell on the non-serving carrier is unknown to the wireless device, Such first module may, for instance, comprise processing circuitry adapted to determine whether the target cell is known or unknown to the wireless device.

The wireless device comprises a first module for applying one of the first gap configuration and the second gap configuration for performing ProSe operation on the target cell on the non-serving carrier. Such second module may, for instance, comprise processing circuitry adapted to apply the first or second gap configuration.

It is noted that one or more of the modules may be replaced by units.

5. Overall Description of Gap Handling for Sidelink Discovery

The following overheads can be included in sidelink gaps.

1. Retuning of Tx/Rx chains (or Turning ON/OFF a Spare Chain) Retuning time is assumed to be one subframe.

2. Synchronization Overhead a. When Discovery is on serving cell (PCell/activated SCell), additional synchronization is not required.

b. When Discovery is on non-serving cell and uses non-serving cell for synchronization, i. Synchronization overhead of up to 20 ms can be required prior to discovery subframes if the non-serving cell is known to the UE.

ii. Synchronization overhead of up to 50 ms as one time event can be required if the non-serving cell is unknown to the UE and the UE is able to detect the non-serving cell in the first attempt.

3. Subframe Offset a. When Discovery is on serving cell (PCell/SCell), there is no offset. The timing difference between PCell and SCell can be assumed to be accommodated within the retuning time.

b. When Discovery is on Non-serving Cell i. If UE reports the discovery resources to the serving cell, then subframe offset of +−0.5 ms is possible due to asynchronous timing.

ii. If serving eNB broadcasts discovery resources, RAN4 expects the

SFN offset between the discovery carrier and serving cell can be reported with accuracy of +−5 ms (same as Rel-12 discovery synch window w1). The subframe offset is then +−5 ms.

It may be noted that the above description is valid when a shared Tx/Rx chain is used for Discovery Tx/Rx. If the UE has a spare Tx/Rx chain for discovery, it is possible that a Gap is not required during the time used for synchronization depending on the band combination (WAN and D2D).

ABBREVIATIONS

The following abbreviations are herewith defined, at least some of which are referred to within the current disclosure:

AP Access point
BLER Block error rate
BS Base station
BSC Base station controller
BTS Base transceiver station
CA Carrier aggregation
CC Component carrier
CGI Cell global identity
CRS Cell-Specific Reference Signal
CSI-RS Channel State Information Reference Signal
CQI Channel Quality Indicator
DAS Distributed antenna system
DL Downlink
DMRS Demodulation Reference Signal
DRX Discontinuous reception
eNB eNodeB
FDD Frequency division duplex
M2M machine to machine
MCG Master cell group
MDT Minimization of drive tests
MeNB Master eNode B
MIB Master Information Block
MSR Multi-standard radio
ONC Out of Network Coverage
OSS Operations Support System
SI System Information
PCI Physical cell identity
PCell Primary Cell
PMI Pre-coding Matrix Indicator
ProSe Proximity Services
PSCell Primary serving cell
PSS Primary synchronization signal
RI Rank Indicator
RIP Received Interference Power
Rx Receiver
RAT Radio Access Technology
RF Radio frequency
RLM Radio link monitoring
RNC Radio Network Controller
RRC Radio resource control
RSRP Reference Signal Received Power
RSRQ Reference Signal Received Quality
RSTD Reference signal time difference
SCell Secondary Cell
SCG Secondary Cell Group
SeNB Secondary eNode B
SFN System frame number
SI System Information
SIB System Information Block
SINR Signal to interference and noise ratio
SNR Signal-to-noise ratio
SON Self-organizing networks
SSS Secondary synchronization signal
TDD Time division duplex
Tx Transmitter
UE User equipment
UL Uplink
WAN Wide Area Network

The invention claimed is:

1. A method, performed in a network node, for enabling Proximity Services (ProSe) operation for a wireless device on a non-serving carrier, the network node serving the wireless device on a cell on a serving carrier, the method comprising:

receiving a gap request from the wireless device for performing ProSe operation on a target cell of the non-serving carrier;

upon receiving the gap request, determining whether the target cell on the non-serving carrier, on which the wireless device is to perform the ProSe operation, is known or unknown to the wireless device based on the wireless device being synchronized to the target cell on the non-serving carrier by knowing a timing of the target cell and being able to receive radio signals from the target cell;

configuring the wireless device:

with a first gap configuration for a case that the target cell on the non-serving carrier is known to the wireless device, wherein the first gap configuration comprises a first gap of a first duration before the start of a ProSe operation duration, wherein the ProSe operation duration includes transmission durations that correspond to subframes expected to be used for ProSe; and with a second gap configuration for a case that the target cell on the non-serving carrier is unknown to the wireless device, wherein the second gap configuration comprises a second gap of a second duration before the start of the ProSe operation duration, and wherein the duration of the gap of the first gap configuration and the second gap configuration is lesser than a ProSe transmission period;

adapting scheduling for the wireless device based on the first gap configuration and the second gap configuration, wherein adapting the scheduling of the wireless device comprises not scheduling the wireless device on the cell on the serving carrier during one of:
the duration of the gap of the first gap configuration for the case that the target cell on the non-serving carrier is known to the wireless device, and
the duration of the gap of the second gap configuration for the case that the target cell on the non-serving carrier is unknown to the wireless device; and
signalling the gap configuration configured for the wireless device to one or more network nodes.

2. The method of claim 1, wherein adapting the scheduling for the wireless device further comprises adapting the scheduling for the wireless device based on the first gap configuration and the second gap configuration such that the wireless device has no operation on the cell on the serving carrier during the first duration of the first gap or the second duration of the second gap, and wherein the second gap duration is greater than the first duration of the first gap configuration.

3. A network node for enabling Proximity Services (ProSe) operation for a wireless device on a non-serving carrier, the network node being configured to serve the wireless device on a cell on a serving carrier, the network node comprising:
a communication interface circuit configured to communicate with the wireless device;
a processor circuit operatively coupled to the communication interface circuit; and
a memory operatively coupled to the processor circuit and storing program instructions for execution by the processor circuit, such that the processor circuit is configured to:
receive a gap request from the wireless device for performing ProSe operation on a target cell of the non-serving carrier;
upon receiving the gap request, determine whether the target cell on the non-serving carrier, on which the wireless device is to perform the ProSe operation, is known or unknown to the wireless device based on the wireless device being synchronized to the target cell on the non-serving carrier by knowing a timing of the target cell and being able to receive radio signals from the target cell;
configure the wireless device, using the communication interface circuit:
with a first gap configuration for a case that the target cell on the non-serving carrier is known to the wireless device, wherein the first gap configuration comprises a first gap of a first duration before a start of a ProSe operation duration, wherein the ProSe operation duration includes transmission durations that correspond to subframes expected to be used for ProSe; and
with a second gap configuration for a case that the target cell on the non-serving carrier is unknown to the wireless device, wherein the second gap configuration comprises a second gap of a second duration before the start of the ProSe operation duration, and wherein the duration of the gap of the first gap configuration and the second gap configuration is lesser than a ProSe transmission period;
adapt scheduling for the wireless device based on the first gap configuration and the second gap configuration, wherein the adapting the scheduling of the wireless device comprises not scheduling the wireless device on the cell on the serving carrier during one of:
the duration of the gap of the first gap configuration for the case that the target cell on the non-serving carrier is known to the wireless device, and
the duration of the gap of the second gap configuration for the case that the target cell on the non-serving carrier is unknown to the wireless device; and
signal the gap configuration configured for the wireless device to one or more network nodes.

4. The network node of claim 3, wherein the processor circuit is further configured to adapt scheduling for the wireless device based on the configuration of the gap.

5. The network node of claim 4, wherein the processor circuit is configured to adapt the scheduling by scheduling such that the wireless device has no operation on the cell on the serving carrier during a duration of the configured first gap configuration or a duration of the configured second gap configuration, and wherein a duration of a gap of the second gap configuration is greater than a duration of a gap of the first gap configuration.

6. The network node of claim 3, wherein the processor circuit is configured to determine whether the target cell is known or unknown further based on one or more of: the wireless device being synchronized to the target cell on the non-serving carrier, historical information and a location of the target cell being within a defined distance in relation to the wireless device, and cells monitored by the wireless device.

7. The network node of claim 6, wherein the processor circuit is configured to determine whether the target cell is known or unknown further based on time elapsed since the target cell was last monitored by the wireless device.

8. A method performed in a wireless device for performing Proximity Services (ProSe) operation on a non-serving carrier, the wireless device being served by a network node on a cell on a serving carrier, the method comprising:
sending a gap request to a network node for performing ProSe operation on a target cell of the non-serving carrier;
obtaining:
a first gap configuration for a case that the target cell on the non-serving carrier is known to the wireless device, wherein the first gap configuration comprises a first gap of a first duration before the start of a Prose operation duration, wherein the ProSe operation duration includes transmission durations that correspond to subframes expected to be used for ProSe, and
a second gap configuration for a case that the target cell on the non-serving carrier is unknown to the wireless device, wherein the second gap configuration comprises a second gap of a second duration before start of the ProSe operation duration;
determining whether the target cell on the non-serving carrier is known or unknown to the wireless device based on the wireless device being synchronized to the target cell on the non-serving carrier by knowing a timing of the target cell and being able to receive radio signals from the target cell; and
applying one of the first gap configuration and the second gap configuration for
performing the ProSe operation on the target cell on the non-serving carrier, wherein the wireless device is not scheduled on the cell on the serving carrier during one of:

the duration of the gap of the first gap configuration for the case that the target cell on the non-serving carrier is known to the wireless device, and the duration of the gap of the second gap configuration for the case that the target cell on the non-serving carrier is unknown to the wireless device, and wherein the duration of the gap of the first gap configuration and the second gap configuration is lesser than a ProSe transmission period.

9. A wireless device for performing Proximity Services (ProSe) operation on a non-serving carrier, the wireless device being served by a network node on a cell on a serving carrier, the wireless device comprising:

a receiver and a transmitter configured to communicate with the network node;

a processor circuit operatively coupled to the receiver and the transmitter; and a memory operatively coupled to the processor circuit and storing program instructions for execution by the processor circuit, such that the processor circuit is configured to:

send a gap request to the network node for performing ProSe operation on a target cell of the non-serving carrier;

obtain:

a first gap configuration for a case that the target cell on the non-serving carrier is known to the wireless device, wherein the first gap configuration comprises a first gap of a first duration before the start of a Prose operation duration, wherein the ProSe operation duration includes transmission durations that correspond to subframes expected to be used for ProSe; and a second gap configuration for a case that the target cell on the non-serving carrier is unknown to the wireless device, wherein the second gap configuration comprises a second gap of a second duration before start of the ProSe operation duration;

determine whether the target cell on the non-serving carrier is known or unknown to the wireless device based on the wireless device being synchronized to the target cell on the non-serving carrier by knowing a timing of the target cell and being able to receive radio signals from the target cell; and apply one of the first gap configuration and the second gap configuration for performing the ProSe operation on the target cell on the non-serving carrier, wherein the wireless device is not scheduled on the cell on the serving carrier during one of:

the duration of the gap of the first gap configuration for the case that the target cell on the non-serving carrier is known to the wireless device, and the duration of the gap of the second gap configuration for the case that the target cell on the non-serving carrier is unknown to the wireless device, wherein the duration of the gap of the first gap configuration and the second gap configuration is lesser than a ProSe transmission period, wherein the processor is further configured to:

obtain by determining whether the target cell on the non-serving carrier, on which the wireless device is to perform the ProSe operation, is known or unknown to the wireless device, and to:

determine a duration of a gap of the first gap configuration for the case that the target cell on the non-serving carrier is known to the wireless device, and determine a duration of a gap of a second gap configuration for the case that the target cell on the non-serving carrier is unknown to the wireless device, and wherein the wireless device is further configured to signal the determined durations to the network node.

10. The wireless device of claim 9, wherein the processor circuit is configured to determine whether the target cell is known or unknown further based on: the wireless device being synchronized to the target cell on the non-serving carrier, the wireless device having sent the measurement report for the target cell on the non-serving carrier within the defined time period and cells monitored by the wireless device.

11. The wireless device of claim 9, wherein the processor circuit is configured to adapt, based on the obtained first gap configuration or the obtained second gap configuration, a measurement procedure for measurements on the target cell.

12. The wireless device of claim 9, wherein the processor circuit is configured to obtain by receiving, from the network node, a gap configuration, and to use the received gap configuration for synchronizing a receiver and transmitter of the wireless device with time and frequency of the non-serving carrier.

13. The wireless device of claim 12, wherein the processor circuit is configured to receive and/or transmit ProSe signaling on the non-serving carrier during the received gap configuration.

* * * * *